(12) United States Patent
Beeson et al.

(10) Patent No.: US 11,865,648 B2
(45) Date of Patent: *Jan. 9, 2024

(54) MULTIPLE INPUT WELDING VISION SYSTEM

(71) Applicant: Illinois Tool Works Inc., Glenview, IL (US)

(72) Inventors: Richard Beeson, Appleton, WI (US); William J. Becker, Manitowoc, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,506

(22) Filed: Mar. 29, 2022

(65) Prior Publication Data

US 2023/0048131 A1 Feb. 16, 2023

Related U.S. Application Data

(63) Continuation of application No. 17/021,543, filed on Sep. 15, 2020, now Pat. No. 11,285,558, which is a
(Continued)

(51) Int. Cl.
*B23K 9/095* (2006.01)
*B23K 9/32* (2006.01)
(Continued)

(52) U.S. Cl.
CPC .......... *B23K 9/0953* (2013.01); *B23K 9/0956* (2013.01); *B23K 9/322* (2013.01);
(Continued)

(58) Field of Classification Search
CPC ..... B23K 9/0953; B23K 9/322; B23K 9/0956
See application file for complete search history.

(56) References Cited

U.S. PATENT DOCUMENTS

| 3,652,824 A | 3/1972 | Okada |
| 4,021,840 A | 5/1977 | Ellsworth |

(Continued)

FOREIGN PATENT DOCUMENTS

| CA | 2725719 A1 | 6/2012 |
| CA | 2778699 | 11/2012 |

(Continued)

OTHER PUBLICATIONS

'ASH VR1-DIY Homebrew PC Virtual Reality Head Mounted Display HMD,' alrons1972, https://www.youtube.com/ Watch?v=VOQboDZqguU, Mar. 3, 2013, YouTube screenshot submitted in lieu of the video itself.

(Continued)

*Primary Examiner* — Richard T Torrente
(74) *Attorney, Agent, or Firm* — McAndrews, Held & Malloy, Ltd.

(57) ABSTRACT

Welding headwear comprises one or more image sensors, processing circuitry, and a display. The image sensor(s) are operable to capture an image of an unpowered weld torch as the torch passes along a joint of a workpiece to be welded. The processing circuitry is operable to: determine, through processing of pixel data of the image, one or more welding parameters as the torch passes along the joint to be welded; generate, based on the one or more welding parameters, a simulated weld bead; and superimpose on the image, in real time as the torch passes along the joint, the simulated weld bead on the joint. The display is operable to present, in real time as the torch passes along the joint, the image with the simulated bead overlaid on it.

5 Claims, 9 Drawing Sheets

Related U.S. Application Data continuation of application No. 14/600,283, filed on Jan. 20, 2015, now Pat. No. 10,773,329.

(51) Int. Cl.
*G09B 5/00* (2006.01)
*G09B 19/24* (2006.01)
*G06T 7/00* (2017.01)

(52) U.S. Cl.
CPC .............. *G09B 5/00* (2013.01); *G06T 7/0002* (2013.01); *G09B 19/24* (2013.01)

(56) References Cited

U.S. PATENT DOCUMENTS

| | | | |
|---|---|---|---|
| 4,280,137 A | 7/1981 | Ashida |
| 4,477,712 A | 10/1984 | Lillquist |
| 4,577,796 A | 3/1986 | Powers |
| 4,641,292 A | 2/1987 | Tunnell |
| 4,679,068 A | 7/1987 | Lillquist |
| 4,733,051 A | 3/1988 | Nadeau |
| 4,812,614 A | 3/1989 | Wang |
| 5,275,327 A | 1/1994 | Watkins |
| 5,291,423 A | 3/1994 | Roeoesli |
| 5,380,978 A | 1/1995 | Pryor |
| 5,572,102 A | 11/1996 | Goodfellow |
| 5,580,475 A | 12/1996 | Sakai |
| 5,923,555 A | 7/1999 | Bailey |
| 5,932,123 A | 8/1999 | Marhofer |
| 5,978,090 A | 11/1999 | Burri |
| 6,122,042 A | 9/2000 | Wunderman et al. |
| 6,240,253 B1 | 5/2001 | Yamaguchi |
| 6,242,711 B1 | 6/2001 | Cooper |
| 6,572,379 B1 | 6/2003 | Sears |
| 6,587,186 B2 | 7/2003 | Bamji |
| 6,734,393 B1 | 5/2004 | Friedl |
| 7,107,118 B2 | 9/2006 | Orozco |
| 7,534,005 B1 | 5/2009 | Buckman |
| 7,926,118 B2 | 4/2011 | Becker |
| 7,962,967 B2 | 6/2011 | Becker |
| 7,987,492 B2 | 7/2011 | Liwerant |
| 8,274,013 B2 | 9/2012 | Wallace |
| 8,316,462 B2 | 11/2012 | Becker et al. |
| 8,502,866 B2 | 8/2013 | Becker |
| 8,525,077 B2 | 9/2013 | Peters |
| 8,569,646 B2 | 10/2013 | Daniel |
| 8,569,655 B2 | 10/2013 | Cole |
| 8,605,008 B1 | 12/2013 | Prest |
| 8,648,903 B2 | 2/2014 | Loipetsberger |
| 8,657,605 B2 | 2/2014 | Wallace |
| 8,680,434 B2 | 3/2014 | Stoger et al. |
| 8,723,918 B2 | 5/2014 | Shimada |
| 8,747,116 B2 | 6/2014 | Zboray et al. |
| 8,777,629 B2 | 7/2014 | Kreindl |
| 8,808,164 B2 | 8/2014 | Hoffman |
| 8,826,357 B2 | 9/2014 | Fink |
| 8,834,168 B2 | 9/2014 | Peters |
| 8,851,896 B2 | 10/2014 | Wallace |
| 8,860,257 B2 | 10/2014 | Schiefermueller |
| 8,911,237 B2 | 12/2014 | Postlethwaite |
| 8,915,740 B2 | 12/2014 | Zboray |
| 8,934,029 B2 | 1/2015 | Nayar |
| 8,957,835 B2 | 2/2015 | Hoellwarth |
| 8,964,298 B2 | 2/2015 | Haddick |
| RE45,398 E | 3/2015 | Wallace |
| 8,992,226 B1 | 3/2015 | Leach |
| 9,011,154 B2 | 4/2015 | Kindig |
| 9,012,802 B2 | 4/2015 | Daniel |
| 9,050,678 B2 | 6/2015 | Daniel |
| 9,050,679 B2 | 6/2015 | Daniel |
| 9,056,365 B2 | 6/2015 | Hoertenhuber |
| 9,073,138 B2 | 7/2015 | Wills |
| 9,089,921 B2 | 7/2015 | Daniel |
| 9,097,891 B2 | 8/2015 | Border |
| 9,101,994 B2 | 8/2015 | Albrecht |
| D737,834 S | 9/2015 | Niedereder |
| 9,196,169 B2 | 11/2015 | Wallace |
| 9,199,328 B2 | 12/2015 | Albrecht |
| 9,221,117 B2 | 12/2015 | Conrardy |
| 9,230,449 B2 | 1/2016 | Conrardy |
| 9,235,051 B2 | 1/2016 | Salter |
| 9,244,539 B2 | 1/2016 | Venable |
| 9,269,279 B2 | 2/2016 | Penrod et al. |
| 9,280,913 B2 | 3/2016 | Peters |
| 9,293,056 B2 | 3/2016 | Zboray |
| 9,293,057 B2 | 3/2016 | Zboray |
| 9,318,026 B2 | 4/2016 | Peters |
| 9,330,575 B2 | 5/2016 | Peters |
| 9,336,686 B2 | 5/2016 | Peters |
| 9,352,411 B2 | 5/2016 | Batzler |
| 9,368,045 B2 | 6/2016 | Becker |
| D765,111 S | 8/2016 | Cole |
| 9,468,988 B2 | 10/2016 | Daniel |
| 9,483,959 B2 | 11/2016 | Wallace |
| 2002/0017752 A1 | 2/2002 | Levi |
| 2004/0034608 A1 | 2/2004 | De Miranda et al. |
| 2004/0189675 A1 | 9/2004 | Pretlove |
| 2004/0249495 A1 | 12/2004 | Orozco |
| 2005/0001155 A1 | 1/2005 | Fergason |
| 2005/0099102 A1 | 5/2005 | Villarreal |
| 2005/0103766 A1 | 5/2005 | Iizuka |
| 2005/0103767 A1 | 5/2005 | Kainec |
| 2005/0161357 A1 | 7/2005 | Allan |
| 2005/0199605 A1 | 9/2005 | Furman |
| 2006/0087502 A1 | 4/2006 | Karidis |
| 2006/0207980 A1 | 9/2006 | Jacovetty |
| 2006/0213892 A1 | 9/2006 | Ott |
| 2006/0281971 A1 | 12/2006 | Sauer |
| 2007/0187378 A1 | 8/2007 | Karakas |
| 2008/0083351 A1 | 4/2008 | Lippert |
| 2008/0158502 A1 | 7/2008 | Becker |
| 2008/0187235 A1 | 8/2008 | Wakazono |
| 2008/0314887 A1 | 12/2008 | Stoger |
| 2009/0014500 A1 | 1/2009 | Cho et al. |
| 2009/0134203 A1 | 5/2009 | Domec et al. |
| 2009/0231423 A1 | 9/2009 | Becker et al. |
| 2009/0276930 A1 | 11/2009 | Becker |
| 2009/0298024 A1 | 12/2009 | Batzler |
| 2010/0206851 A1 | 8/2010 | Nakatate |
| 2010/0223706 A1 | 9/2010 | Becker et al. |
| 2011/0006047 A1 | 1/2011 | Penrod |
| 2011/0091846 A1* | 4/2011 | Kreindl .................. B23K 9/095 434/234 |
| 2011/0108536 A1 | 5/2011 | Inada |
| 2011/0117527 A1 | 5/2011 | Conrardy |
| 2011/0187859 A1 | 8/2011 | Edelson |
| 2011/0220616 A1 | 9/2011 | Mehn |
| 2011/0220619 A1 | 9/2011 | Mehn |
| 2011/0227934 A1 | 9/2011 | Sharp |
| 2011/0309236 A1 | 12/2011 | Tian |
| 2012/0006800 A1 | 1/2012 | Ryan |
| 2012/0012561 A1 | 1/2012 | Wiryadinata |
| 2012/0074114 A1 | 3/2012 | Kawamoto |
| 2012/0176659 A1 | 7/2012 | Hsieh |
| 2012/0180180 A1 | 7/2012 | Steve |
| 2012/0189993 A1 | 7/2012 | Kindig |
| 2012/0229632 A1 | 9/2012 | Hoertenhuber |
| 2012/0241429 A1 | 9/2012 | Knoener |
| 2012/0249400 A1 | 10/2012 | Demonchy |
| 2012/0262601 A1 | 10/2012 | Choi |
| 2012/0291172 A1 | 11/2012 | Wills |
| 2012/0298640 A1 | 11/2012 | Conrardy |
| 2013/0050432 A1 | 2/2013 | Perez |
| 2013/0081293 A1 | 4/2013 | Delin |
| 2013/0189657 A1 | 7/2013 | Wallace |
| 2013/0189658 A1 | 7/2013 | Peters |
| 2013/0206740 A1 | 8/2013 | Pfeifer et al. |
| 2013/0206741 A1 | 8/2013 | Pfeifer et al. |
| 2013/0208569 A1 | 8/2013 | Pfeifer |
| 2013/0215281 A1 | 8/2013 | Hobby |
| 2013/0229485 A1 | 9/2013 | Rusanovskyy |
| 2013/0230832 A1* | 9/2013 | Peters ...................... G09B 5/02 434/234 |
| 2013/0234935 A1 | 9/2013 | Griffith |

(56) References Cited

U.S. PATENT DOCUMENTS

| | | |
|---|---|---|
| 2013/0288211 A1 | 10/2013 | Patterson |
| 2013/0291271 A1 | 11/2013 | Becker |
| 2013/0321462 A1 | 12/2013 | Salter |
| 2014/0013478 A1 | 1/2014 | Cole |
| 2014/0014637 A1 | 1/2014 | Hunt |
| 2014/0014638 A1 | 1/2014 | Artelsmair |
| 2014/0017642 A1 | 1/2014 | Postlethwaite |
| 2014/0020147 A1 | 1/2014 | Anderson |
| 2014/0042136 A1 | 2/2014 | Daniel et al. |
| 2014/0059730 A1 | 3/2014 | Kim |
| 2014/0065584 A1 | 3/2014 | Wallace |
| 2014/0069899 A1 | 3/2014 | Mehn |
| 2014/0069900 A1 | 3/2014 | Becker |
| 2014/0092015 A1 | 4/2014 | Xing |
| 2014/0134579 A1 | 5/2014 | Becker |
| 2014/0134580 A1* | 5/2014 | Becker ............... G09B 9/00 434/234 |
| 2014/0144896 A1 | 5/2014 | Einav |
| 2014/0144899 A1 | 5/2014 | Ulrich |
| 2014/0159995 A1 | 6/2014 | Adams |
| 2014/0183176 A1 | 7/2014 | Hutchison |
| 2014/0184496 A1 | 7/2014 | Gribetz |
| 2014/0185282 A1 | 7/2014 | Hsu |
| 2014/0205976 A1 | 7/2014 | Peters |
| 2014/0220522 A1 | 8/2014 | Peters |
| 2014/0234813 A1 | 8/2014 | Peters |
| 2014/0238965 A1 | 8/2014 | Spisic |
| 2014/0257589 A1 | 9/2014 | Spisic |
| 2014/0263224 A1 | 9/2014 | Becker |
| 2014/0263249 A1 | 9/2014 | Miller |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0312020 A1 | 10/2014 | Daniel |
| 2014/0312022 A1 | 10/2014 | Dantinne |
| 2014/0315167 A1 | 10/2014 | Kreindl |
| 2014/0320529 A1 | 10/2014 | Roberts |
| 2014/0322684 A1 | 10/2014 | Wallace |
| 2014/0326705 A1 | 11/2014 | Kodama |
| 2014/0346158 A1 | 11/2014 | Matthews |
| 2015/0009316 A1 | 1/2015 | Baldwin |
| 2015/0034618 A1 | 2/2015 | Langeder |
| 2015/0041447 A1 | 2/2015 | Niedereder |
| 2015/0056584 A1 | 2/2015 | Boulware |
| 2015/0056585 A1 | 2/2015 | Boulware |
| 2015/0072323 A1 | 3/2015 | Postlethwaite |
| 2015/0125836 A1 | 5/2015 | Daniel |
| 2015/0154884 A1 | 6/2015 | Salsich |
| 2015/0170539 A1 | 6/2015 | Barrera |
| 2015/0190875 A1 | 7/2015 | Becker |
| 2015/0190876 A1 | 7/2015 | Becker |
| 2015/0190887 A1 | 7/2015 | Becker |
| 2015/0190888 A1 | 7/2015 | Becker |
| 2015/0194072 A1 | 7/2015 | Becker |
| 2015/0194073 A1 | 7/2015 | Becker |
| 2015/0209887 A1 | 7/2015 | Delisio |
| 2015/0228203 A1 | 8/2015 | Kindig |
| 2015/0235565 A1 | 8/2015 | Postlethwaite |
| 2015/0248845 A1 | 9/2015 | Postlethwaite |
| 2015/0266128 A1 | 9/2015 | Wills |
| 2015/0304538 A1 | 10/2015 | Huang |
| 2015/0325153 A1 | 11/2015 | Albrecht |
| 2015/0348439 A1 | 12/2015 | Zboray |
| 2015/0348441 A1 | 12/2015 | Zboray |
| 2015/0352653 A1 | 12/2015 | Albrecht |
| 2015/0356888 A1 | 12/2015 | Zboray |
| 2015/0375324 A1 | 12/2015 | Becker |
| 2015/0375327 A1 | 12/2015 | Becker |
| 2015/0379894 A1 | 12/2015 | Becker |
| 2016/0012750 A1 | 1/2016 | Wallace |
| 2016/0027215 A1 | 1/2016 | Burns |
| 2016/0039034 A1 | 2/2016 | Becker |
| 2016/0039053 A1 | 2/2016 | Becker |
| 2016/0049085 A1 | 2/2016 | Beeson |
| 2016/0089743 A1 | 3/2016 | Dunahoo |
| 2016/0093233 A1 | 3/2016 | Boulware |
| 2016/0114418 A1 | 4/2016 | Jones |
| 2016/0125592 A1 | 5/2016 | Becker et al. |
| 2016/0125593 A1 | 5/2016 | Becker |
| 2016/0125594 A1 | 5/2016 | Becker |
| 2016/0125761 A1 | 5/2016 | Becker |
| 2016/0125762 A1 | 5/2016 | Becker |
| 2016/0125763 A1 | 5/2016 | Becker |
| 2016/0125764 A1 | 5/2016 | Becker |
| 2016/0129516 A1 | 5/2016 | Hoeger |
| 2016/0155358 A1 | 6/2016 | Zboray |
| 2016/0155359 A1 | 6/2016 | Zboray |
| 2016/0155360 A1 | 6/2016 | Zboray et al. |
| 2016/0155361 A1 | 6/2016 | Peters |
| 2016/0163221 A1 | 6/2016 | Sommers |
| 2016/0171906 A1 | 6/2016 | Matthews |
| 2016/0183677 A1 | 6/2016 | Achillopoulos |
| 2016/0189559 A1 | 6/2016 | Peters |
| 2016/0203732 A1 | 7/2016 | Wallace |
| 2016/0203733 A1 | 7/2016 | Wallace |
| 2016/0203734 A1 | 7/2016 | Boulware |
| 2016/0203735 A1 | 7/2016 | Boulware |
| 2016/0207134 A1 | 7/2016 | Beeson |
| 2016/0207135 A1 | 7/2016 | Beeson |
| 2016/0214199 A1 | 7/2016 | Benzing |
| 2016/0214200 A1 | 7/2016 | Beeson |
| 2016/0236303 A1 | 8/2016 | Matthews |
| 2016/0243640 A1 | 8/2016 | Albrecht |
| 2016/0250706 A1 | 9/2016 | Beeson |
| 2016/0250723 A1 | 9/2016 | Albrecht |
| 2016/0260261 A1 | 9/2016 | Hsu |
| 2016/0267806 A1 | 9/2016 | Hsu et al. |
| 2016/0284311 A1 | 9/2016 | Patel |
| 2016/0288236 A1 | 10/2016 | Becker |
| 2016/0307460 A1 | 10/2016 | Peters |
| 2016/0321954 A1 | 11/2016 | Peters |
| 2016/0331592 A1 | 11/2016 | Stewart |
| 2016/0343268 A1 | 11/2016 | Postlethwaite |
| 2016/0358503 A1 | 12/2016 | Batzler |
| 2016/0365004 A1 | 12/2016 | Matthews |
| 2016/0375524 A1 | 12/2016 | Hsu |
| 2017/0053557 A1 | 2/2017 | Daniel |
| 2017/0294140 A1 | 10/2017 | Chica Barrera |

FOREIGN PATENT DOCUMENTS

| | | |
|---|---|---|
| CN | 2046417 | 10/1989 |
| CN | 1043457 | 7/1990 |
| CN | 101247531 | 8/2008 |
| CN | 102098438 | 6/2011 |
| CN | 103687687 A | 3/2014 |
| EP | 0165501 | 12/1985 |
| EP | 0525621 | 2/1993 |
| EP | 2082656 A1 | 7/2009 |
| JP | S52126656 | 10/1977 |
| JP | 2002178148 | 6/2002 |
| JP | 2016203205 | 12/2016 |
| WO | 0112376 | 2/2001 |
| WO | 2008101379 A1 | 8/2008 |
| WO | 2009114753 | 9/2009 |
| WO | 2009137379 A1 | 11/2009 |
| WO | 2013122805 A1 | 8/2013 |
| WO | 20140188244 | 11/2014 |
| WO | 2015121742 | 8/2015 |
| WO | 2016044680 | 3/2016 |

OTHER PUBLICATIONS

High Dynamic Range (HDR) Video Image Processing for Digital Glass, Augmented Reality in Quantigraphic Lightspace and Mediated Reality with Remote Expert, Raymond Lo, Sep. 12, 2012, https://www.youtube.com/ Watch?v=ygcm0AQXX9k, YouTube screenshot submitted in lieu of the video itself.

Optical Head-Mounted Display, Wikipedia, Jun. 2, 2016, https://en.wikipedia.org/wiki/Optical_head-mounted_display 14 pages.

(56) References Cited

OTHER PUBLICATIONS

Soldamatic Augmented Training, Augmented Reality World, May 30, 2013, https://www.youtube.com/watch? V=Mn0052Ow_qY, YouTube screenshot submitted in lieu of the video itself.
"High Dynamic Range (HDR) Video Image Processing for Digital Glass, Wearable Cybernetic Eye Tap Helmet Prototype," Raymond Lo, https://www.youtube.com/watch?v=gtTdiqDqHc8, Sep. 12, 2012, YouTube screenshot Submitted in lieu of the video itself.
About Us. Weldobot.com. <http://weldobot.com/?page_id=6> Accessed Jun. 2, 2016. 1 page.
AD-081CL Digital 2CCD Progressive Scan HDR/High Frame Rate Camera User's Manual, Jul. 1, 2012 (Jul. 1, 2012) p. 27, XP055269758, Retrieved from the Internet: URL:http://www.stemmer-imaging.de/media/up loads/docmanager/53730_JAI_AD-081_CL_Manual.pdf [retrieved on Apr. 29, 2016] the whole document (55 pages).
Aiteanu, Dorin, "Virtual and Augmented Reality Supervisor for a New Welding Helmet" Nov. 15, 2005, pp. 1-150.
Altasens—Wide Dynamic Range (WDR), http://www.altasens.com/index.php/technology/wdr (1 page), [retrieved Jan. 5, 2016).
Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).
Anonymous: "JAI introduces unique high-dynamic-range camera", Nov. 5, 2009 (Nov. 5, 2009), XP055269759, Retrieved from the Internet: URL:http://www.jai.com/en/newsevents/news/ad-081c1 [retrieved on Apr. 29, 2016] Typical HDR applications for the AD-081CL include inspection tasks where incident light or bright reflections are Oresent, such as . . . welding (2 pages).
Cameron Series: "Why Weld Cameras Need Why High Dynamic Range Imaging", Apr. 10, 2013 (Apr. 10, 2013), XP055269605, Retrieved from the Internet: URL:http://blog.xiris.com/blog/bid/258666/Why-Weld-Cameras-Need-High-Dynamic-Range-Imaging [retrieved on Apr. 29, 2016] the whole document (5 pages).
Cavilux HF, Laser Light for High-Speed Imaging, See What You Have Missed (2 pages).
Cavilux Smart, Laser Light for Monitoring and High Speed Imaging, Welcome to the Invisible World (2 pages).
Choi et al., Simulation of Dynamic Behavior in a GMAW System, Welding Research Supplement, Oct. 2001, 239-s thru 245-s (7 pages).
Communication from European Patent Office Appln No. 18 150 120.6 dated Jul. 4, 2018 (9 pgs).
Daqri Smart Helmet, The World's First Wearable Human Machine Interface, Brochure (9 pages).
Electronic speckle pattern interferometry Wikipedia, the free encyclopedia (4 pages), [retrieved Feb. 10, 2015].
Frank Shaopeng Cheng (2008). Calibration of Robot Reference Frames for Enhanced Robot Positioning Accuracy, Robot Manipulators, Marco Ceccarelli (Ed.), ISBN: 978-953-7619-06-0, InTech, Available from: http://www.intechopen.com/books/robot_manipulators/calibration_of_robot_reference_frames_for_enhanced_r obot_positioning_accuracy (19 pages).
G. Melton et al: "Laser diode based vision system for viewing arc welding (May 2009)", EUROJOIN 7, May 21, 2009 (May 21, 2009), XP055293872, Venice Lido, Italy, May 21-22, 2009.
Handheld Welding Torch with Position Detection technology description, Sep. 21, 2011 (11 pages).
HDR Camera for Industrial and Commercial Use, Invisual E Inc., http://www.invisuale.com/hardware/hdr-camera.html (2 pages), [retrieved Jan. 5, 2016).
Heston, Tim, Lights, camera, lean-recording manufacturing efficiency, The Fabricator, Aug. 2010 (4 pages).
Hillers, Bernd & Aiteanu, D & Tschirner, P & Park, M & Graeser, Axel & Balazs, B & Schmidt, L. (2004). TEREBES: Welding helmet with AR capabilities.
Hillers, Bernd, Iat Institut fur Automatislerungstechnik, doctoral thesis Selective Darkening Filer and Welding Arc Observation for the Manual Welding Process, Mar. 15, 2012,152 pgs.

Int' Search Report and the Written Opinion Appln No. PCT/US2016/016107, dated May 17, 2016 (11 pages).
Int'l Search Report and Written Opinion for PCT/US2015/065573 dated Mar. 24, 2016.
Int'l Search Report and Written Opinion for PCT/US2015/067931 dated Jul. 26, 2016 (19 pages).
Int'l Search Report and Written Opinion Appln No. PCT/ US2016/012164, dated May 12, 2016.
Int'l Search Report and Written Opinion for PCT/US2015/065565 dated Apr. 1, 2016.
Int'l Search Report and Written Opinion for PCT/US2016/035473 dated Aug. 17, 2016 (15 pages).
Int'l Search Report and Written Opinion for PCT/US2018/028261 dated Aug. 6, 2018 (17 pgs).
Intelligent Robotic Arc Sensing, Lincoln Electric, Oct. 20, 2014, http://www.lincolnelectric.com/en-us/support/ process-and-theory/pages/intelligent-robotic-detail.aspx (3 pages).
Intelligenter SchweiBbrenner, Intelligent Welding Torch, IP Bewertungs Ag (IPB) (12 pages).
International Search Report and Written Opinion corresponding to International Patent Application No. PCT/US2016/020861, dated May 23, 2016.
Li, Larry, Time-of-Flight Camera—An Introduction, Technical White Paper, SLOA190B—Jan. 2014, revised May 2014 (10 pages).
LiveArc Welding Performance Management System, A reality-based recruiting, screening and training solution, MillerWelds.com 2014 (4 pages).
Lutwak, Dr. Robert, DARPA, Microsystems Tech. Office, Micro-Technology for Positioning, Navigation, and Timing Towards PNT Everywhere and Always, Feb. 2014 (4 pages).
Lutwak, Dr. Robert, Micro-Technology for Positioning, Navigation, and Timing Towards PNT Everywhere and Always Stanford PNT Symposium, Stanford, CA Oct. 29, 2014 (26 pages).
Mnich, Chris, et al., "In situ weld pool measurement using sterovision," Japan-UA Symposium on Flexible Automation, Denver, CO 2004.
Ni, Y et al. A 768x576 Logarithmic Image Sensor with Photodiode in Solar Cell Mode, New Imaging Technologies (4 pges).
Ni, Yang, et al., A CMOS Log Image Sensor with On-Chip FPN Compensation (4 pages).
NIT Color Management, R&D Report N RD1113-Rev B, Apr. 11, 2011 (31 pages).
NIT Image Processing Pipeline for Lattice HDR-6-, NIP, Pipeline, IP_NIT_NSC1005C_HDR60_V1_0 (23 pages) Jun. 14, 2012.
NIT Image Processing Pipeline, R&D Report N RD1220-Rev B, May 14, 2012 (10 pages).
NIT, 8Care12004-02-B1 Datasheet, New Imaging Technologies (9 pages) Jul. 17, 2012.
NIT, Application Note: Native WDRTM for your Industrial Welding Applications, www.new-imaging-technologies.com (2 pages).
NIT, Magic Technology—White Paper, Scene Contrast Indexed Image Sensing with WDR (14 pages).
NIT, NSC1005, Datasheet, Revised Nov. 2012, NSC1005 HD ready Logarithmic CMOS Sensor (28 pages).
NIT, WiDySwire, New Imaging Technologyies (7 pages).
NIT Image Processing Pipeline for Lattice HDR-60, NIP IP Pipeline, NIT_HDR60_V1_0_Pipeline_Sample (48 pages) Jun. 14, 2012.
OV10642:1.3-Megapixel OmniHDRTM, http://www.ovt.com/applications/application.php?id=7 (2 pages) Dec. 1, 2014.
Parnian, Neda et al., Integration of a Multi-Camera Vision System and Strapdown Inertial Naviation System (SDINS) with a Modified Kalman Filter, Sensors 2010,10, 5378-5394; doi: 10.3390/s100605378 (17 pages).
Patent Cooperation Treaty, Notification of Transmittal of the International Search Report and the Written Opinion of the International Searching Authority, in PCT/US2016/020865, dated May 11, 2016,12 pages.
Patent Cooperation Treaty, Notification of Transmittal of the International Search Report and the Written Opinion of the The International Searching Authority, in PCT/US2015/065209, dated Apr. 11, 2016 (11 pages).
Pipe-Bug, Motorized & Manual Chain Driven Pipe Cutting Machines From Bug-0 Systems (4 pages).

(56) References Cited

OTHER PUBLICATIONS

Reverchon, J.L., et al. New InGaAs SWIR Imaging Solutions from III-VLab, New Imaging Technologies (10 pages).
Rivers, et al., Position-Correcting Tools for 2D Digital Fabrication (7 pages) Jul. 1, 2012.
Sergi Foix et al: "Exploitation of Time-of-Flight (ToF) Cameras IRI Technical Report", Oct. 1, 2007 (Oct. 1, 2007), pp. 1-22, XP055294087, Retrieved from the Internet: URL:http://digital.csic.es/bitstream/10261/30066/1 Itime-of-flight.pdf [retrieved on Aug. 8, 2016].
Soldamatic User Guide, Seabery Augmented Training & Performance. Seabery Soluciones. Apr. 1, 2013 (36 pgs).
Telops, Innovative Infrared Imaging, HDR-IR High Dynamic Range IR Camera, http://www.telops.com/en/infrared-Cameras/hdr-ir-high-dynamic-range-ir-camera, 2015 (2 pages).
Wavelength Selective Switching, http://en.wikipedia.org/wiki/wavelength_selective_switching, Mar. 4, 2015 (5 pages).
Windows 10 to Get 'Holographic' Headset and Cortana, BBC News, www.bbc.com/news/technology-30924022, Feb. 26, 2015 (4 pages).

\* cited by examiner

MULTIPLE INPUT WELDING VISION SYSTEM

This application is a continuation of U.S. application Ser. No. 17/021,543, filed Sep. 15, 2020, now U.S. Pat. No. 11,285,558, which is a continuation of U.S. application Ser. No. 14/600,283, filed Jan. 20, 2015, now U.S. Pat. No. 10,773,329, all of which are herein incorporated by reference in their entirety.

BACKGROUND

Welding is a process that has increasingly become ubiquitous in all industries. While such processes may be automated in certain contexts, a large number of applications continue to exist for manual welding operations, the success of which relies heavily on the proper use of a welding gun or torch by a welding operator. For instance, improper torch angle, contact-tip-to-work-distance, travel speed, and aim are parameters that may dictate the quality of a weld. Even experienced welding operators, however, often have difficulty monitoring and maintaining these important parameters throughout welding processes.

BRIEF SUMMARY

Methods and systems are provided for weld output control by a welding vision system, substantially as illustrated by and/or described in connection with at least one of the figures, as set forth more completely in the claims.

DETAILED DESCRIPTION

Figure 1:
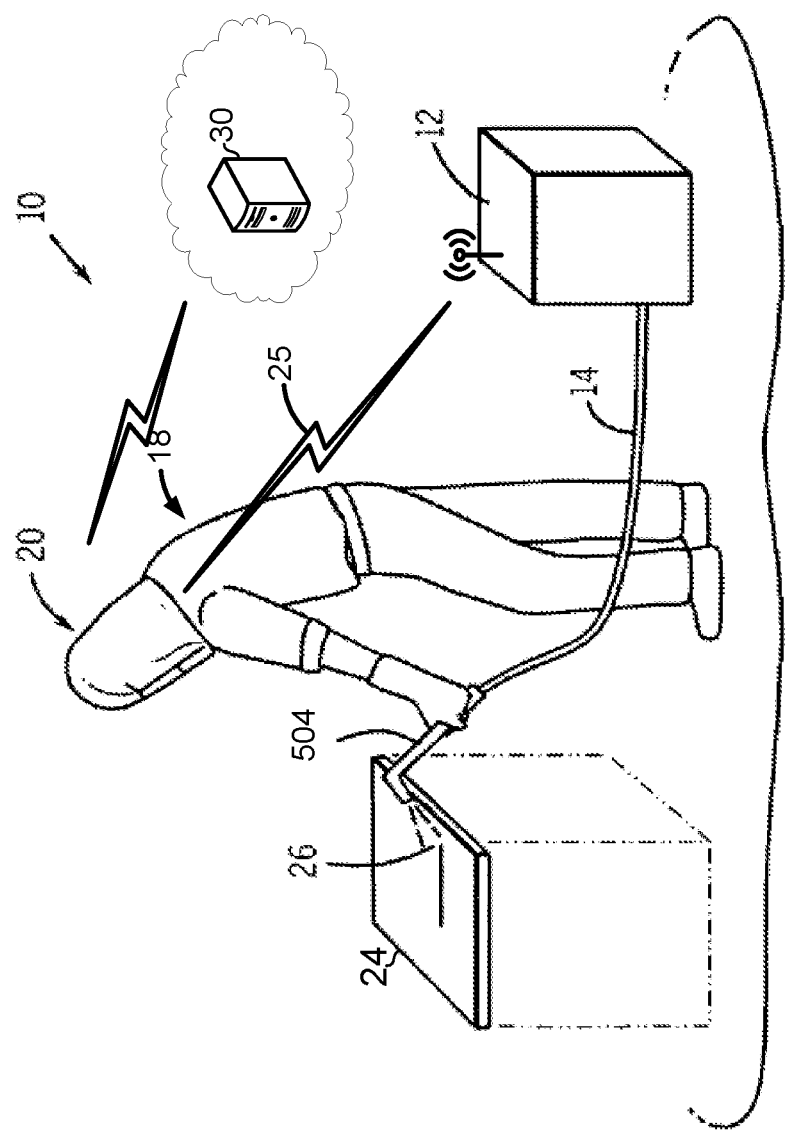
FIG. 1 shows an exemplary arc welding system in accordance with aspects of this disclosure.

Referring to FIG. 1, there is shown an example welding system 10 in which an operator 18 is wearing welding headwear 20 and welding a workpiece 24 using a torch 504 to which power or fuel is delivered by equipment 12 via a conduit 14. The equipment 12 may comprise a power or fuel source, optionally a source of an inert shield gas and, where wire/filler material is to be provided automatically, a wire feeder. The welding system 10 of FIG. 1 may be configured to form a weld joint 512 by any known technique, including flame welding techniques such as oxy-fuel welding and electric welding techniques such shielded metal arc welding (i.e., stick welding), metal inert gas welding (MIG), tungsten inert gas welding (TIG), and resistance welding.

Optionally in any embodiment, the welding equipment 12 may be arc welding equipment that provides a direct current (DC) or alternating current (AC) to a consumable or non-consumable electrode 16 (better shown, for example, in FIG. 5C) of a torch 504. The electrode 16 delivers the current to the point of welding on the workpiece 24. In the welding system 10, the operator 18 controls the location and operation of the electrode 16 by manipulating the torch 504 and triggering the starting and stopping of the current flow. When current is flowing, an arc 26 is developed between the electrode and the workpiece 24. The conduit 14 and the electrode 16 thus deliver current and voltage sufficient to create the electric arc 26 between the electrode 16 and the workpiece. The arc 26 locally melts the workpiece 24 and welding wire or rod supplied to the weld joint 512 (the electrode 16 in the case of a consumable electrode or a separate wire or rod in the case of a non-consumable electrode) at the point of welding between electrode 16 and the workpiece 24, thereby forming a weld joint 512 when the metal cools.

As shown, and described more fully below, the equipment 12 and headwear 20 may communicate via a link 25 via which the headwear 20 may control settings of the equipment 12 and/or the equipment 12 may provide information about its settings to the headwear 20. Although a wireless link is shown, the link may be wireless, wired, or optical.

Figure 2:
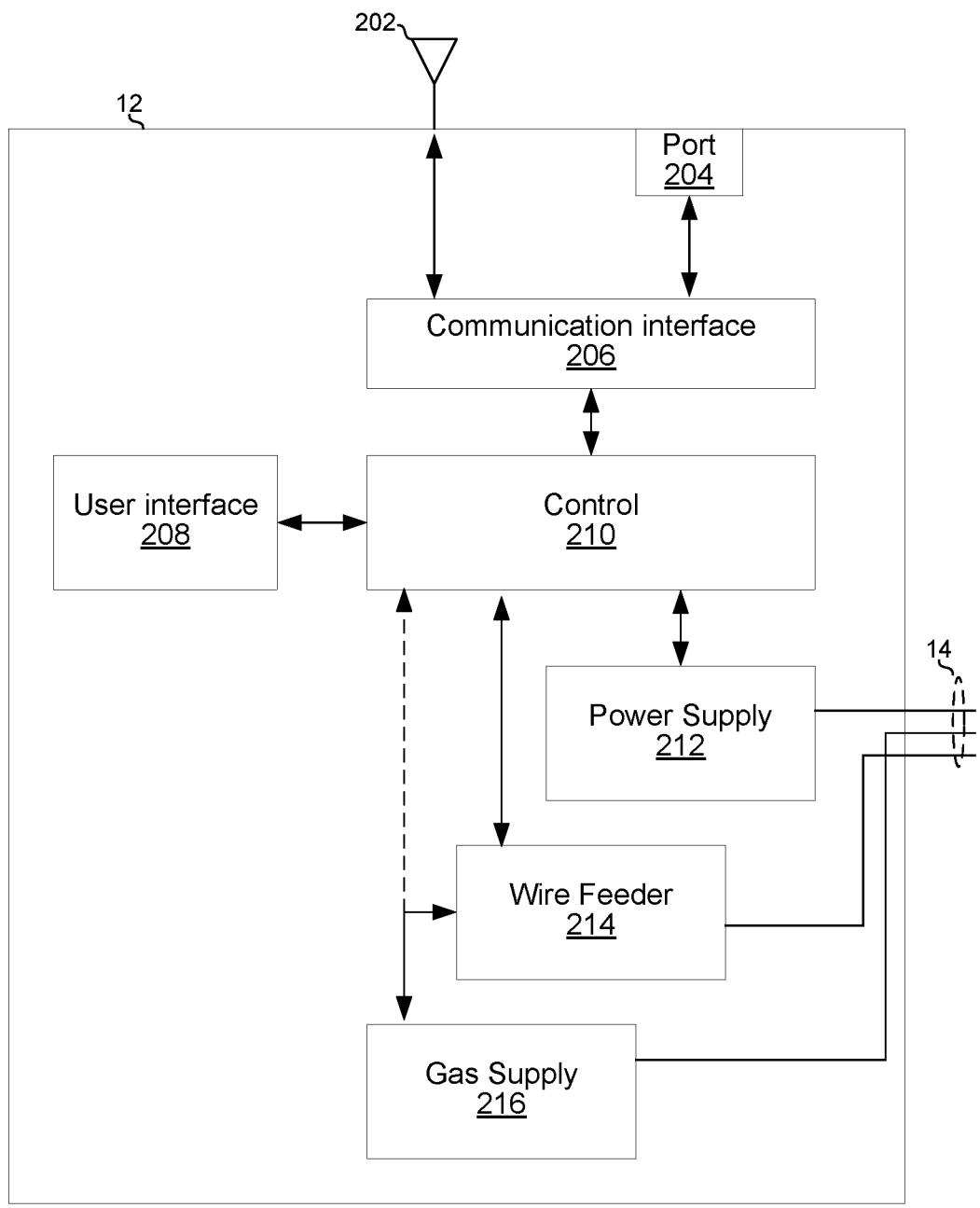
FIG. 2 shows example welding equipment in accordance with aspects of this disclosure.

FIG. 2 shows example welding equipment in accordance with aspects of this disclosure. The equipment 12 of FIG. 2 comprises an antenna 202, a communication port 204, communication interface circuitry 206, user interface module 208, control circuitry 210, power supply circuitry 212, wire feeder module 214, and gas supply module 216.

The antenna 202 may be any type of antenna suited for the frequencies, power levels, etc. used by the communication link 25.

The communication port 204 may comprise, for example, an Ethernet over twisted pair port, a USB port, an HDMI port, a passive optical network (PON) port, and/or any other suitable port for interfacing with a wired or optical cable.

The communication interface circuitry 206 is operable to interface the control circuitry 210 to the antenna 202 and/or port 204 for transmit and receive operations. For transmit, the communication interface 206 may receive data from the control circuitry 210 and packetize the data and convert the data to physical layer signals in accordance with protocols in use on the communication link 25. For receive, the communication interface may receive physical layer signals via the antenna 202 or port 204, recover data from the received physical layer signals (demodulate, decode, etc.), and provide the data to control circuitry 210.

The user interface module 208 may comprise electromechanical interface components (e.g., screen, speakers, microphone, buttons, touchscreen, etc.) and associated drive circuitry. The user interface 208 may generate electrical signals in response to user input (e.g., screen touches, button presses, voice commands, etc.). Driver circuitry of the user interface module 208 may condition (e.g., amplify, digitize, etc.) the signals and them to the control circuitry 210. The user interface 208 may generate audible, visual, and/or tactile output (e.g., via speakers, a display, and/or motors/actuators/servos/etc.) in response to signals from the control circuitry 210.

The control circuitry 210 comprises circuitry (e.g., a microcontroller and memory) operable to process data from the communication interface 206, the user interface 208, the power supply 212, the wire feeder 214, and/or the gas supply 216; and to output data and/or control signals to the communication interface 206, the user interface 208, the power supply 212, the wire feeder 214, and/or the gas supply 216.

The power supply circuitry 212 comprises circuitry for generating power to be delivered to a welding electrode via conduit 14. The power supply circuitry 212 may comprise, for example, one or more voltage regulators, current regulators, inverters, and/or the like. The voltage and/or current output by the power supply circuitry 212 may be controlled by a control signal from the control circuitry 210. The power supply circuitry 212 may also comprise circuitry for reporting the present current and/or voltage to the control circuitry 210. In an example implementation, the power supply circuitry 212 may comprise circuitry for measuring the voltage and/or current on the conduit 14 (at either or both ends of the conduit 14) such that reported voltage and/or current is actual and not simply an expected value based on calibration.

The wire feeder module 214 is configured to deliver a consumable wire electrode 16 to the weld joint 512. The wire feeder 214 may comprise, for example, a spool for holding the wire, an actuator for pulling wire off the spool to deliver to the weld joint 512, and circuitry for controlling the rate at which the actuator delivers the wire. The actuator may be controlled based on a control signal from the control circuitry 210. The wire feeder module 214 may also comprise circuitry for reporting the present wire speed and/or amount of wire remaining to the control circuitry 210. In an example implementation, the wire feeder module 214 may comprise circuitry and/or mechanical components for measuring the wire speed, such that reported speed is actual and not simply an expected value based on calibration.

The gas supply module 216 is configured to provide shielding gas via conduit 14 for use during the welding process. The gas supply module 216 may comprise an electrically controlled valve for controlling the rate of gas flow. The valve may be controlled by a control signal from control circuitry 210 (which may be routed through the wire feeder 214 or come directly from the control 210 as indicated by the dashed line). The gas supply module 216 may also comprise circuitry for reporting the present gas flow rate to the control circuitry 210. In an example implementation, the gas supply module 216 may comprise circuitry and/or mechanical components for measuring the gas flow rate such that reported flow rate is actual and not simply an expected value based on calibration.

Figure 3:
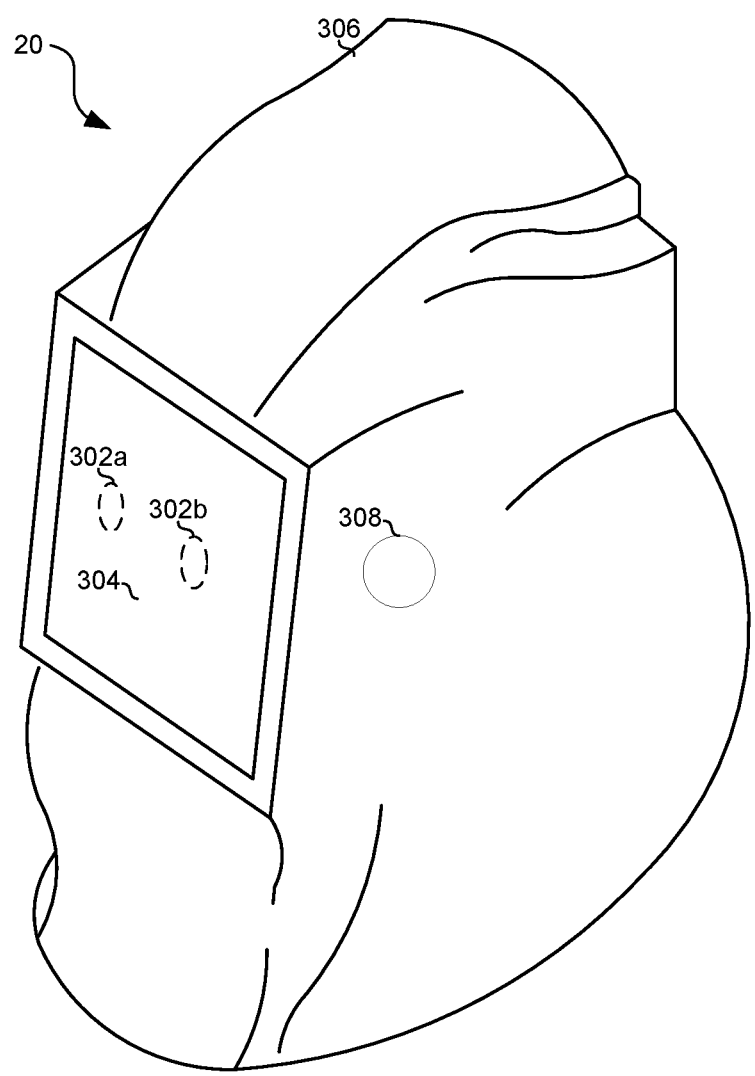
FIG. 3 shows example welding headwear in accordance with aspects of this disclosure.
Figure 4:
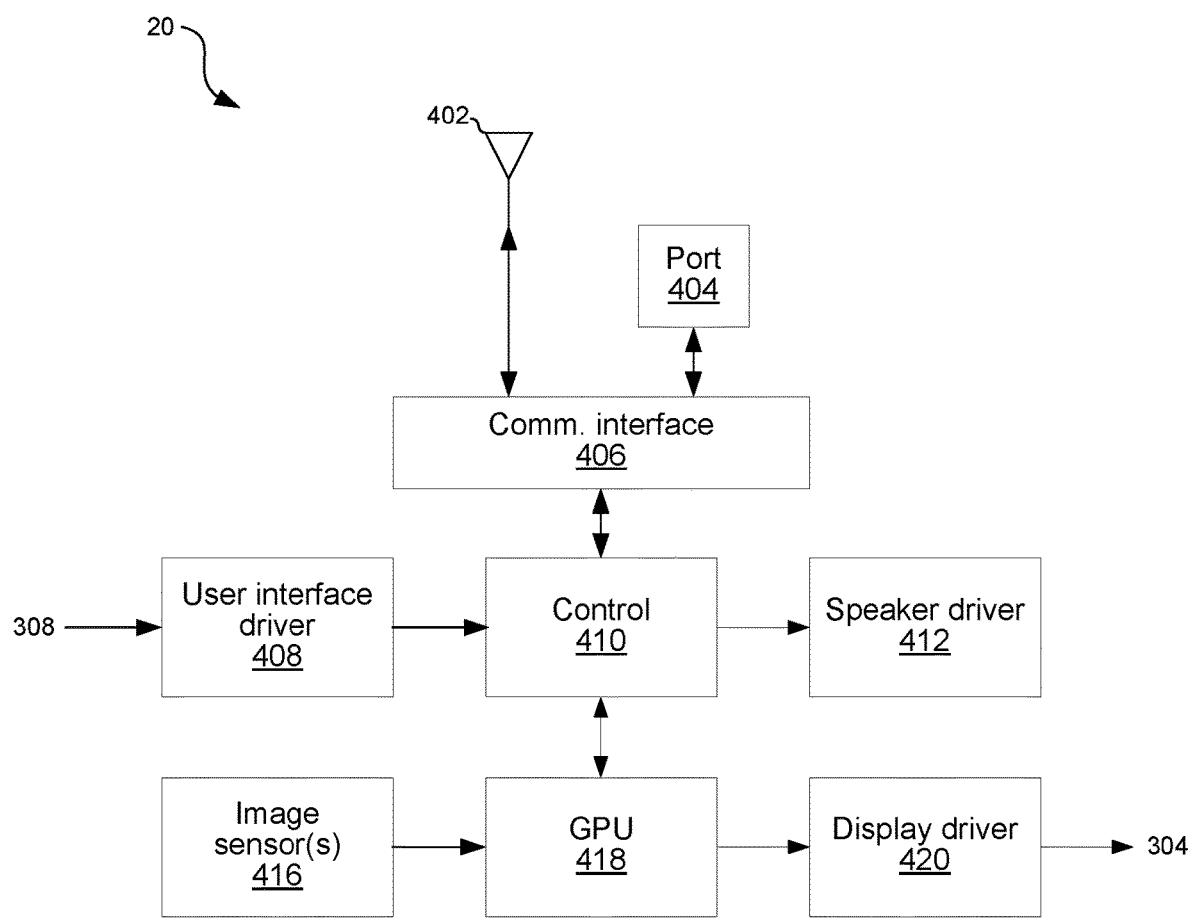
FIG. 4 shows example circuitry of the headwear of FIG. 3.

FIGS. 3 and 4 show example welding headwear in accordance with aspects of this disclosure. The example headwear 20 is a helmet comprising a shell 306 in or to which are mounted: one or more cameras comprising optical components 302 and image sensor(s) 416, a display 304, electromechanical user interface components 308, an antenna 402, a communication port 404, a communication interface 406, user interface driver circuitry 408, a central processing unit (CPU) 410, speaker driver circuitry 412, graphics processing unit (GPU) 418, and display driver circuitry 420. The headwear also may be a functional welding mask or goggles, for example, so it can be used either for actual welding or for simulated welding with minimal changeover.

Each set of optics 302 may comprise, for example, one or more lenses, filters, and/or other optical components for capturing electromagnetic waves in the spectrum ranging from, for example, infrared to ultraviolet. In an example implementation, optics 302a and 302b for two cameras may be positioned approximately centered with the eyes of a wearer of the helmet 20 to capture stereoscopic images (at any suitable frame rate ranging from still photos to video at 30 fps, 100 fps, or higher) of the field of view that a wearer of the helmet 20 would have if looking through a lens.

The display 304 may comprise, for example, a LCD, LED, OLED. E-ink, and/or any other suitable type of display operable to convert electrical signals into optical signals viewable by a wearer of the helmet 20.

The electromechanical user interface components 308 may comprise, for example, one or more touchscreen elements, speakers, microphones, physical buttons, etc. that generate electric signals in response to user input. For example, electromechanical user interface components 308 may comprise capacity, inductive, or resistive touchscreen sensors mounted on the back of the display 304 (i.e., on the outside of the helmet 20) that enable a wearer of the helmet 20 to interact with user interface elements displayed on the front of the display 304 (i.e., on the inside of the helmet 20).

The antenna 402 may be any type of antenna suited for the frequencies, power levels, etc. used by the communication link 25.

The communication port 404 may comprise, for example, an Ethernet over twisted pair port, a USB port, an HDMI port, a passive optical network (PON) port, and/or any other suitable port for interfacing with a wired or optical cable.

The communication interface circuitry 406 is operable to interface the control circuitry 410 to the antenna 202 and port 204 for transmit and receive operations. For transmit, the communication interface 406 may receive data from the control circuitry 410 and packetize the data and convert the data to physical layer signals in accordance with protocols in use on the communication link 25. The data to be transmitted may comprise, for example, control signals for controlling the equipment 12. For receive, the communication interface may receive physical layer signals via the antenna 202 or port 204, recover data from the received physical layer signals (demodulate, decode, etc.), and provide the data to control circuitry 410. The received data may comprise, for example, indications of current settings and/or actual measured output of the equipment 12 (e.g., voltage, amperage, and/or wire speed settings and/or measurements).

The user interface driver circuitry 408 is operable to condition (e.g., amplify, digitize, etc.) signals from the user interface component(s) 308.

The control circuitry 410 is operable to process data from the communication interface 406, the user interface driver 408, and the GPU 418, and to generate control and/or data signals to be output to the speaker driver circuitry 412, the GPU 418, and the communication interface 406. Signals output to the communication interface 406 may comprise, for example, signals to control settings of equipment 12. Such signals may be generated based on signals from the GPU 418 and/or the user interface driver 408. Signals from the communication interface 406 may comprise, for example, indications (received via link 25) of current settings and/or actual measured output of the equipment 12. Signals to the GPU 418 may comprise, for example, signals to control graphical elements of a user interface presented on display 304. Signals from the GPU 418 may comprise, for example, information determined based on analysis of pixel data captured by images sensors 416.

The speaker driver circuitry 412 is operable to condition (e.g., convert to analog, amplify, etc.) signals from the control circuitry 410 for output to one or more speakers of the user interface components 308. Such signals may, for example, carry audio to alert a wearer of the helmet 20 that a welding parameter is out of tolerance, to provide audio instructions to the wearer of the helmet 20, etc.

The image sensor(s) 416 may comprise, for example, CMOS or CCD image sensors operable to convert optical signals to digital pixel data and output the pixel data to GPU 418.

The graphics processing unit (GPU) 418 is operable to receive and process pixel data (e.g., of stereoscopic or two-dimensional images) from the image sensor(s) 416, to output one or more signals to the control circuitry 410, and to output pixel data to the display 304.

The processing of pixel data by the GPU 418 may comprise, for example, analyzing the pixel data to determine, in real time (e.g., with latency less than 100 ms or, more preferably, less than 20 ms), one or more of the following: name, size, part number, type of metal, or other characteristics of the workpiece 24; name, size, part number, type of metal, or other characteristics of the electrode 16 and/or filler material; type or geometry of joint 512 to be welded; 2-D or 3-D positions of items (e.g., electrode, workpiece, etc.) in the captured field of view, one or more weld parameters (e.g., such as those described below with reference to FIG. 5) for an in-progress weld in the field of view; measurements of one or more items in the field of view (e.g., size of a joint or workpiece being welded, size of a bead formed during the weld, size of a weld puddle formed during the weld, and/or the like); and/or any other information which may be gleaned from the pixel data and which may be helpful in achieving a better weld, training the operator, calibrating the system 10, etc.

The information output from the GPU 418 to the control circuitry 410 may comprise the information determined from the pixel analysis.

The pixel data output from the GPU 418 to the display 304 may provide a mediated reality view for the wearer of the helmet 20. In such a view, the wearer experiences the video presented on the display 304 as if s/he is looking through a lens, but with the image enhanced and/or supplemented by an on-screen display. The enhancements (e.g., adjust contrast, brightness, saturation, sharpness, etc.) may enable the wearer of the helmet 20 to see things s/he could not see with simply a lens. The on-screen display may comprise text, graphics, etc. overlaid on the video to provide visualizations of equipment settings received from the control circuit 410 and/or visualizations of information determined from the analysis of the pixel data.

The display driver circuitry 420 is operable to generate control signals (e.g., bias and timing signals) for the display 304 and to condition (e.g., level control synchronize, packetize, format, etc.) pixel data from the GPU 418 for conveyance to the display 304.

Figure 5A:
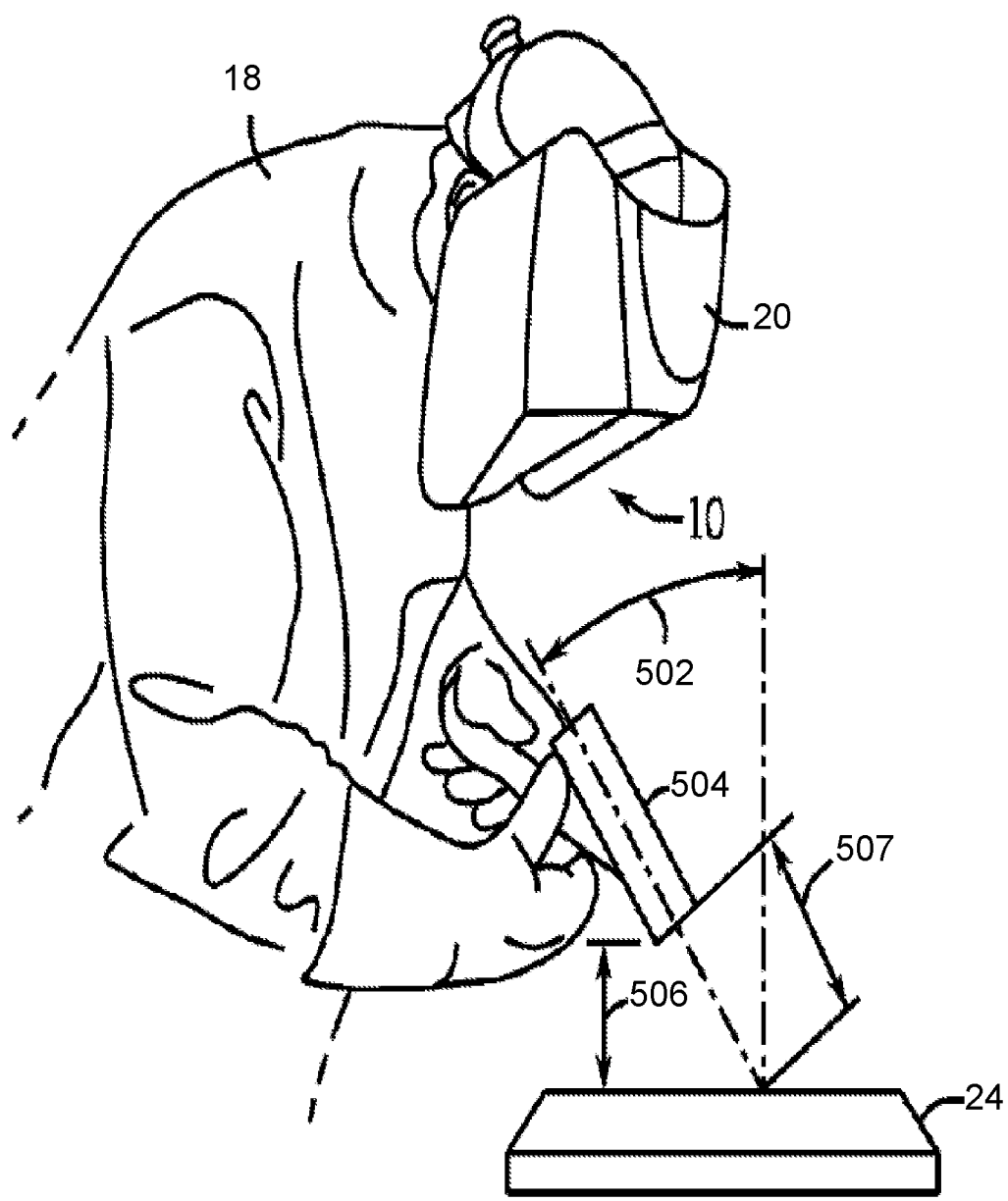
FIGS. 5A-5C illustrate various parameters which may be determined from images of a weld in progress.
Figure 5B:
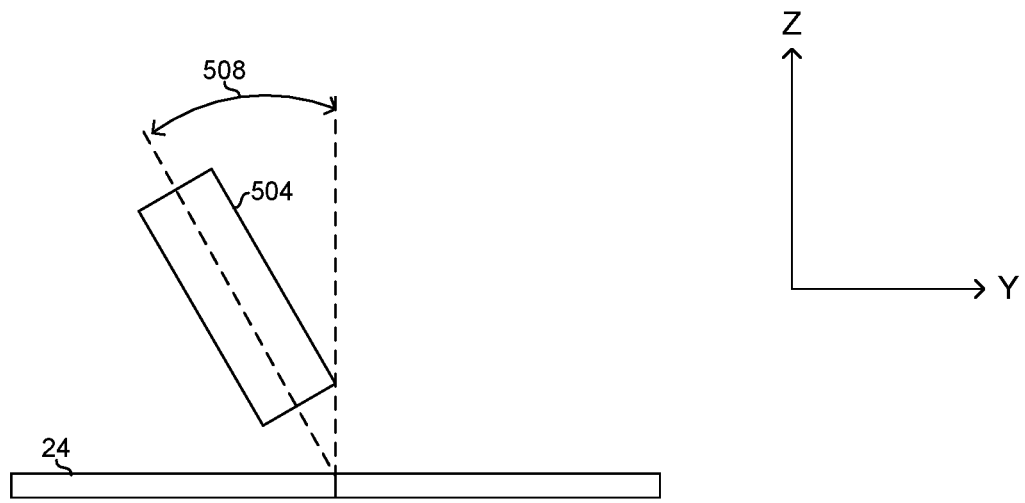
Figure 5C:
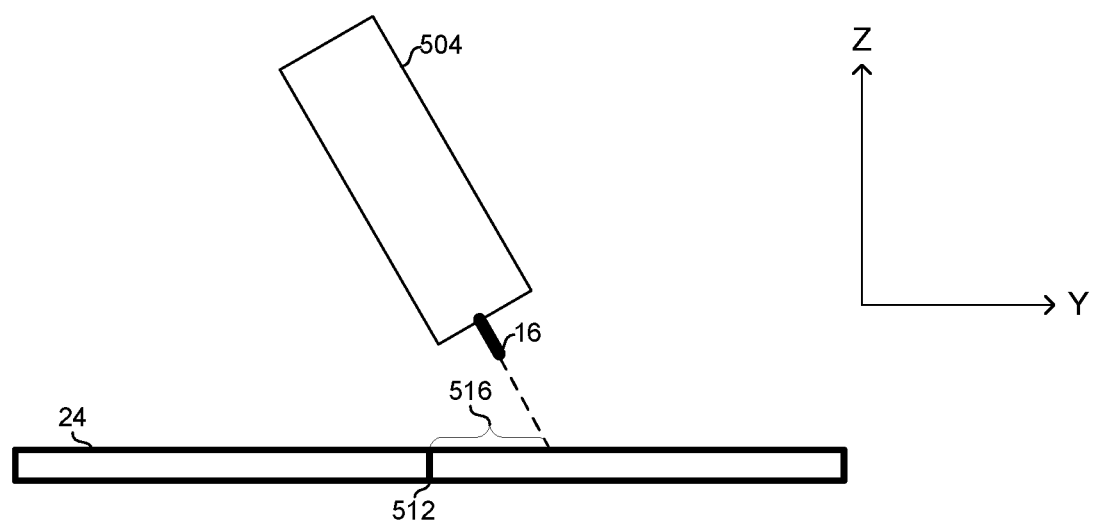

FIGS. 5A-5C illustrate various parameters which may be determined from images of a weld in progress. Coordinate axes are shown for reference. In FIG. 5A the Z axis points to the top of the paper, the X axis points to the right, and the Y axis points into the paper. In FIGS. 5B and 5C, the Z axis points to the top of the paper, the Y axis points to the right, and the X axis points into the paper.

In FIGS. 5A-5C, the equipment 12 comprises a MIG gun 504 that feeds a consumable electrode 16 to a weld joint 512 of the workpiece 24. During the welding operation, a position of the MIG gun 504 may be defined by parameters including: contact-tip-to-work distance 506 or 507, a travel angle 502, a work angle 508, a travel speed 510, and aim.

Contact-tip-to-work distance may include the vertical distance 506 from a tip of the torch 504 to the workpiece 24 as illustrated in FIG. 5A. In other embodiments, the contact-tip-to-work distance may be the distance 507 from the tip of the torch 504 to the workpiece 24 at the angle of the torch 504 to the workpiece 24).

The travel angle 502 is the angle of the gun 504 and/or electrode 16 along the axis of travel (X axis in the example shown in FIGS. 5A-5C).

The work angle 508 is the angle of the gun 504 and/or electrode 16 perpendicular to the axis of travel (Y axis in the example shown in FIGS. 5A-5C).

The travel speed is the speed at which the gun 504 and/or electrode 16 moves along the joint 512 being welded.

The aim is a measure of the position of the electrode 16 with respect to the joint 512 to be welded. Aim may be measured, for example, as distance from the center of the joint 512 in a direction perpendicular to the direction of travel. FIG. 5C, for example, depicts an example aim measurement 516.

Figure 6:
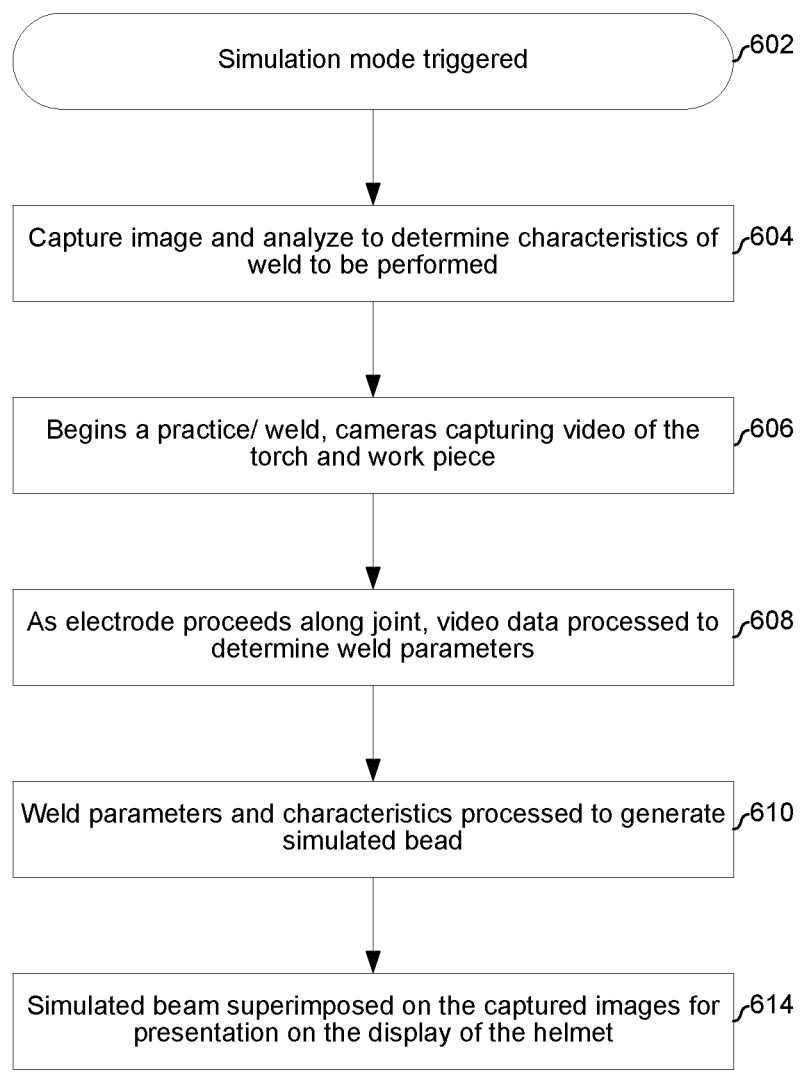
FIG. 6 is a flowchart illustrating an example process for weld bead simulation and visualization.

FIG. 6 is a flowchart illustrating an example process for weld bead simulation and visualization.

In block 602, the operator 18 triggers a simulation mode. For example, the operator 18 may give a voice command to enter simulation mode which may be captured by the user interface of the helmet 20 and the control circuitry 410 may configure the components of the helmet 20 accordingly. The control circuitry 410 may also send a signal to the equipment 12 to trigger a simulation mode in the equipment 12 (e.g., to implement a lock out so that power is not actually delivered to the electrode 16 when a trigger on the gun or torch is pulled).

In block 604, an operator sets up for a weld to be simulated by placing the workpiece, electrode, filler material, etc. in the camera field of view. An image is captured and the pixel data of the image is analyzed to determine characteristics of the weld to be simulated. The characteristics may comprise, for example: name, size, part number, type of metal, or other characteristics of the workpiece 24; name, size, part number, type of metal, or other characteristics of the electrode 16 and/or filler material; type or geometry of joint 512 to be welded; 3-D position of items (e.g., electrode, workpiece, etc.) in the captured field of view, and/or the like. The characteristics may be determined by, for example, analyzing the pixel data to identify distinguishing features (e.g., size, shape, color, etc.) of the workpiece, electrode, filler material, etc. and then looking those features up in a database to retrieve a name, part number, or the like. The characteristics may be determined by, for example, analyzing the pixel data to read markings (e.g., bar codes) on the items to obtain a name/part number/etc. and then using that to retrieve additional characteristics about the items from a database.

In block 606, the operator begins a practice ("practice" is synonymous in this disclosure with "simulated") weld. For example the operator may pull a trigger which may trigger the camera(s) to begin capturing images (e.g., at 30 frames per second or higher) and the operator may begin moving the electrode 16 along the joint 512 as if welding, but without power being delivered to the electrode 16.

In block 608, as the unpowered electrode proceeds along the joint 512, captured pixel data is processed to determine weld parameters such as those described above with reference to FIGS. 5A-5C.

In block 610, the characteristics determined in block 604, the weld parameters determined in block 608, and equipment settings are used to a render a simulated weld bead. The equipment settings may be fixed settings selected by the operator and/or determined automatically based on the characteristics determined in block 604. Alternatively, the equipment settings may vary according to a model to simulate variations in the parameters that would occur during an actual weld. In an example implementation, information from other sensors may be used in combination with, or instead of, the pixel data to render the simulated weld bead. Such sensors may include, for example, a camera mounted separate from the helmet 20 (e.g., in or on the weld torch), an accelerometer mounted in the helmet 20 or apart from the helmet 20, a gyroscope mounted in the helmet 20 or apart from the helmet 20, and/or the like.

In block 614, the simulated weld bead is superimposed on the captured images for presentation to the operator via the display 304 as part of a mediated reality.

Figure 7:
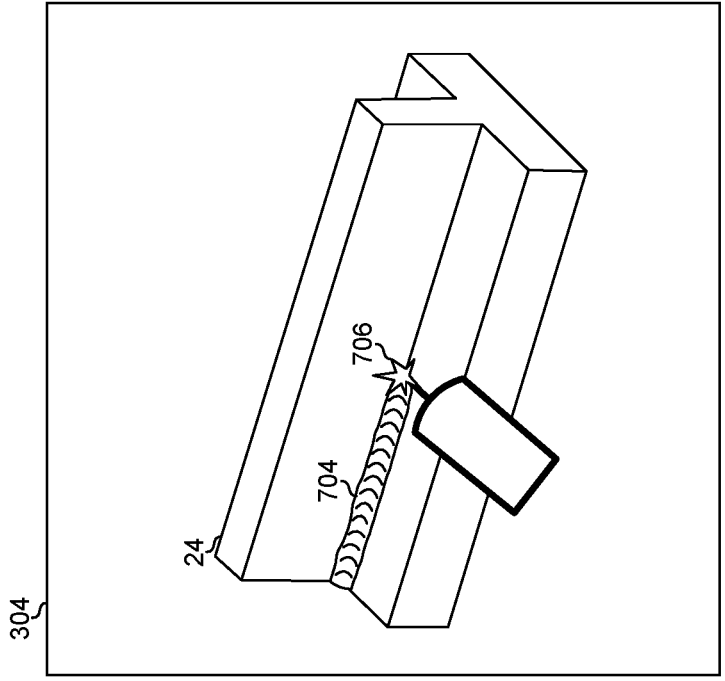
FIG. 7 shows a direct view of a workpiece and a mediated or augmented reality view of a workpiece.
Figure 7:
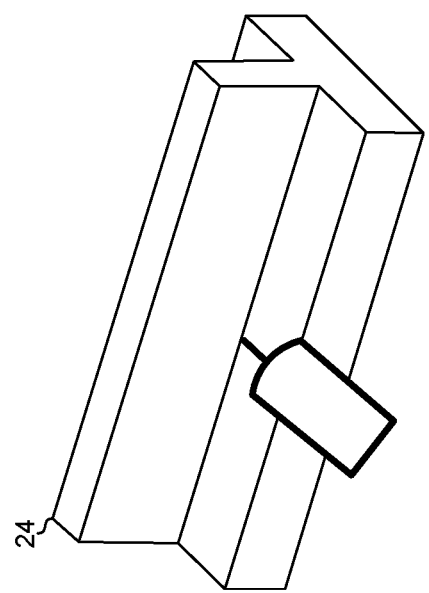

In this manner, the operator is presented with a visualization of what the weld would have looked like had the electrode been powered on. This allows the operator to practice the weld to be performed without damaging the workpiece. That is, the actual workpiece may remain unaffected as shown in the left side of FIG. 7, but the mediated reality view on the display 304 displays the simulated weld bead 704 and may display a simulated arc 706.

Figure 8:
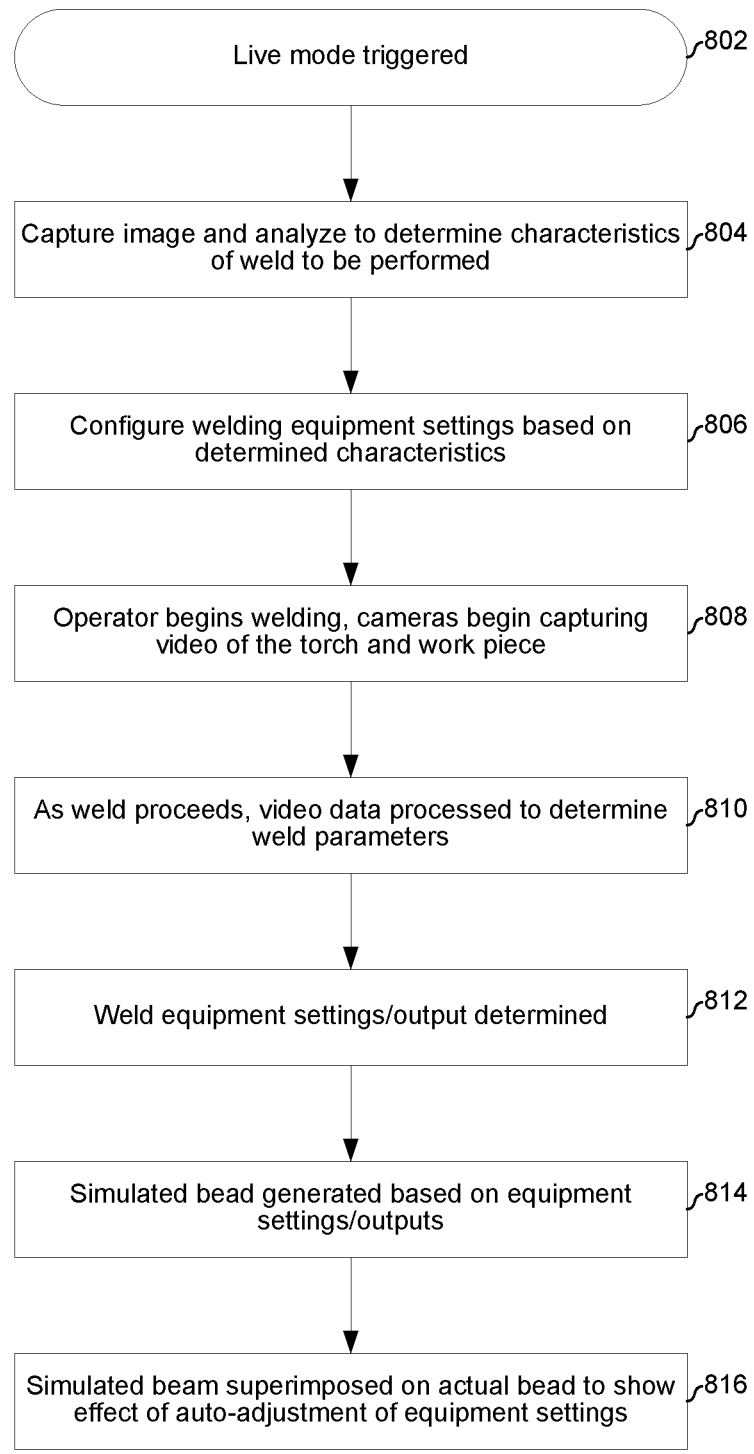
FIG. 8 is a flowchart illustrating an example process for assessing weld performance using a simulated weld bead.

FIG. 8 is a flowchart illustrating an example process for assessing actual welding performance using a simulated weld bead.

In block 802, the operator 18 triggers a live welding mode. For example, the operator 18 may give a voice command to enter live welding mode which may be captured by the user interface of the helmet 20 and the control circuitry 410 configuring the components of the helmet 20 accordingly. The control circuitry 410 may also send a signal to the equipment 12 to trigger a live mode in the equipment 12 (e.g., to disable a lock out so that power is delivered to the electrode 16 when a trigger on the gun or torch is pulled).

In block 804, an operator sets up for an actual weld to be performed by placing the workpiece, electrode, filler material, etc. in the camera field of view. An image is captured and the pixel data of the image is analyzed to determine characteristics of the weld to be performed. The characteristics may comprise, for example, any one or more of: name, size, part number, type of metal, or other characteristics of the workpiece 24; name, size, part number, type of metal, or other characteristics of the electrode 16 and/or filler material; type or geometry of joint 512 to be welded; 3-D position of items (e.g., electrode, workpiece, etc.) in the captured field of view, and/or the like. The characteristics may be determined by, for example, analyzing the pixel data to identify distinguishing features (e.g., size, shape, color, etc.) of the workpiece, electrode, filler material, etc. and then looking those features up in a database to retrieve a name, part number, or the like. The characteristics may be determined by, for example, analyzing the pixel data to read markings (e.g., bar codes) on the items to obtain a name/part number/etc. and then using that to retrieve additional characteristics about the items from a database. In an example implementation, a work order associated with the weld to be performed may be determined and then retrieved from a database. The characteristics of the weld to be performed may then be extracted from the work order.

In block 806, equipment 12 is configured based on the determined characteristics of the weld to be performed. For example, a constant current or constant voltage mode may be selected, a nominal voltage and/or nominal current may be set, a voltage limit and/or current limit may be set, and/or the like. In an example implementation, block 806 may also comprise configuration(s) of the camera(s). For example, expected brightness of the arc may be predicted (based on the equipment configuration and the characteristics determined in block 804 and used to configure the darkness of a lens filter.

In block 808, the operator begins the weld and the camera(s) begin capturing images of the weld. For example, upon the operator pulling the trigger of the welding gun, image capture may begin and current may begin flowing to the electrode. In an example implementation, these events may be sequenced such that image capture starts first and allows a few frames for calibrating the cameras (adjusting focus, brightness, contrast, saturation, sharpness, etc.) before current begins flowing to the electrode, this may ensure sufficient image quality even at the very beginning of the welding operation.

In block 810, as the welding operation proceeds, captured image data is processed to determine, in real-time (e.g., with latency less than 100 ms or, more preferably, less than 20 ms), present welding parameters such as those described above with reference to FIGS. 5A-5C.

In block 812, present settings and/or actual measured output of the weld equipment are determined. This may comprise receiving, for example, settings and/or measured output via the link 25. In an example implementation, the circuitry 410 may adjust the settings based on the parameters determined in block 810. In this manner, equipment settings such as voltage, current, wire speed, and/or others may be adjusted in an attempt to compensate for deviations of the parameters from their ideal values.

In block 814, the characteristics determined in block 804, the weld parameters determined in block 810, and equipment settings and/or actual output determined in block 812 are used to a render a simulated weld bead. In an example implementation, a first simulated weld bead is generated using what the equipment settings would have been without the parameter-compensating adjustments, and a second simulated weld bead is generated using equipment settings as adjusted to compensate for the non-ideal parameters.

In block 816, the simulated weld bead is superimposed on the captured images for presentation to the operator via the display 304 as part of a mediated reality. Where more than one simulated weld bead is generated, the operator may be able to select between them via the user interface.

In live mode, the simulated weld bead(s) may, for example, be used for calibration or verification of bead simulation algorithms and/or for determining the effectiveness of the real-time adjustments of the weld equipment settings.

In accordance with an example implementation of this disclosure, welding headwear (e.g., helmet 20) comprises one or more image sensors (e.g., 416), processing circuitry (e.g., 410 and 418), and a display (e.g., 304). The image sensor(s) are operable to capture an image of an unpowered weld torch as the torch passes along a joint of a workpiece (e.g., 24) to be welded. The processing circuitry is operable to: determine, through processing of pixel data of the image, one or more welding parameters as the torch passes along the joint to be welded; generate, based on the one or more welding parameters, a simulated weld bead; and superimpose on the image, in real time as the torch passes along the joint, the simulated weld bead on the joint. The display is operable to present, in real time as the torch passes along the joint, the image with the simulated bead overlaid on it. The processing circuitry may be operable to detect, through processing of the pixel data of the image, distinguishing features of the joint (e.g., shape, size, local temperature, emission spectrum, etc.) and/or the workpiece (shape, size, color, markings, etc.). The processing circuitry may be operable to retrieve characteristics of the joint and the workpiece from a database based on the distinguishing features. The characteristics may comprise, for example, one or more of: a type of metal of the workpiece, type of welding that the torch is configured to perform, type of the joint. The generation of the simulated weld bead may be based on the characteristics. The processing circuitry may be operable to determine welding equipment settings (e.g., voltage, current, wire speed, etc.) for the joint based on determined characteristics of the joint and the workpiece. The generation of the bead may be based on the determined welding equipment settings. The processing circuitry may be operable to generate a plurality of simulated weld beads based on the determined one or more welding parameters, wherein a first one of the plurality of simulated beads is based on an uncompensated version of the welding equipment settings, and a second one of the plurality of simulated weld beads is based on a version of the welding equipment settings that are compensated based on the one or more welding parameters.

The simulated weld bead can be a realistic image or an enhanced image providing more or different information from that embodied in a realistic image. For example, if it is desirable to control the temperature of the puddle more precisely than the operator can accomplish by observation of a realistic or real puddle, the puddle can be artificially colored to indicate a temperature within or outside the desired range. This might be done, for example, by coloring the puddle yellow if it is too hot, blue if it is too cool, or green if it is within the preferred or required temperature range. The colors can also be shaded to indicate more precisely how hot or how cool the puddle is currently. For example, the green color can be varied to be progressively bluer as the temperature approaches the minimum of the green temperature range and progressively yellower as the temperature approaches the maximum of the green temperature range.

In accordance with an example implementation of this disclosure, welding headwear (e.g., 20) comprises one or more image sensors (e.g., 416), processing circuitry (e.g., 410 and 418), and a display (e.g., 304). The image sensor(s) are operable to capture an image a powered weld torch as the torch passes along the joint 512 and creates a weld. The processing circuitry is operable to: determine, through processing of pixel data of the image, one or more welding parameters for the weld; generate, based on the determined one or more welding parameters, a simulated weld bead for the weld; and superimpose on the image, in real time as the torch passes along the joint 512, the simulated weld bead for the weld. The display is operable to present, in real time as the torch passes along the joint 512, the image with the superimposed simulated weld bead for the weld. The simulated weld bead may be overlaid on the actual weld bead.

The present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. Welding headwear, comprising:
  image sensors configured to capture an image of a weld torch as the torch passes along a joint of a workpiece to be welded, the image captured as pixel data;
  processing circuitry configured to:
    detect, by processing the pixel data of the image, distinguishing features of the joint and the workpiece;
    retrieve, based on the distinguishing features, characteristics of the joint and the workpiece from a database;
    generate, based on one or more welding parameters and the characteristics of the joint and the workpiece, a simulated weld bead; and
    generate an augmented reality or mediated reality image by superimposing, on the image in real time as the torch passes along the joint, the simulated weld bead on the joint; and
  a display configured to present, in real time as the torch passes along the joint, the image with the simulated weld bead.

2. The welding headwear as defined in claim 1, wherein the distinguishing features of the joint comprise at least one of shape, size, local temperature, or emission spectrum.

3. The welding headwear as defined in claim 1, wherein the distinguishing features of the workpiece comprise at least one of a shape of the workpiece, a size of the workpiece, or a color of the workpiece.

4. The welding headwear as defined in claim 1, wherein the processing circuitry is configured to determine a work order associated with the workpiece based on the distinguishing features.

5. The welding headwear as defined in claim 1, wherein the characteristics of the welding joint or the workpiece comprise at least one of: a name, a size, a part number, a type of metal, a joint type, or a joint geometry.

\* \* \* \* \*